United States Patent
Tsai et al.

(10) Patent No.: US 7,552,253 B2
(45) Date of Patent: Jun. 23, 2009

(54) SYSTEMS AND METHODS FOR DETERMINING SIZE OF A DEVICE BUFFER

(75) Inventors: Wen-Chung Tsai, Taipei County (TW); Jung-Tsan Hsu, Taipei County (TW)

(73) Assignee: Via Technologies, Inc., Taipei (TW)

( * ) Notice: Subject to any disclaimer, the term of this patent is extended or adjusted under 35 U.S.C. 154(b) by 188 days.

(21) Appl. No.: 11/610,701

(22) Filed: Dec. 14, 2006

(65) Prior Publication Data

US 2007/0294439 A1 Dec. 20, 2007

(30) Foreign Application Priority Data

Jun. 14, 2006 (TW) .............................. 95121164 A

(51) Int. Cl.
G06F 5/00 (2006.01)
G06F 15/16 (2006.01)

(52) U.S. Cl. ........................................ 710/52; 709/230

(58) Field of Classification Search .................. 710/52; 709/230
See application file for complete search history.

(56) References Cited

U.S. PATENT DOCUMENTS 5,796,961 A * 8/1998 O'Brien ...................... 710/107
5,916,309 A * 6/1999 Brown et al. .................. 710/52
6,178,475 B1 * 1/2001 O'Brien ...................... 710/116
7,000,058 B1 * 2/2006 Mrasek ....................... 710/307
7,062,595 B2 * 6/2006 Lindsay et al. .............. 710/315
7,251,702 B2 * 7/2007 Lee et al. .................... 710/240
2005/0013317 A1 * 1/2005 Lindsay et al. .............. 370/462
2007/0198730 A1 * 8/2007 Tsai et al. ................... 709/230

OTHER PUBLICATIONS

Xilinx, Tri-Mode Ethernet MAC V2.1, Apr. 28, 2005.*

* cited by examiner

*Primary Examiner*—Khanh Dang
*Assistant Examiner*—Christopher A Daley
(74) *Attorney, Agent, or Firm*—Thomas, Kayden, Horstemeyer & Risley

(57) ABSTRACT

A method for determining a buffer size of devices in an embedded system is disclosed. A buffer fill time (BFT) and a request response time (RRT) are determined. Next, a media data rate (MDR) and a number of bus masters (NBM) are calculated. Finally, a lowest buffer size of a device is determined according to the BFT, the MDR and NBM of the system.

22 Claims, 4 Drawing Sheets

SYSTEMS AND METHODS FOR DETERMINING SIZE OF A DEVICE BUFFER

BACKGROUND OF THE INVENTION

1. Field of the Invention

The invention relates to method for determining size of a buffer, and in particular to size of a buffer in an embedded system.

2. Description of the Related Art

Recently, with increased popularity of embedded systems, devices therein, such as CPUs, bridges, and media access controllers (MAC) may share with the same bus, although only one can access data therethrough at a given time. Thus, an arbiter must obtain authority to utilize the bus based on arbitration rules such as polling or priority. When a device in the embedded system attempts to utilize the bus, a request signal is sent to the arbiter to request bus use. The arbiter chooses one requesting device according to the arbitration rules, the priority of each requesting device, and current status of the bus. Once a device is chosen, the arbiter returns a grant signal thereto. After receiving the grant signal, the chosen device utilizes the bus, for example, accessing data therethrough. Other requesting devices await a grant signal in turn.

Some devices in the embedded system, such as a MAC controller in a network chip, require continuous data transmission. For example, for an Ethernet MAC controller, an entire packet must be transmitted to, for example, a physical layer, continuously. A buffer is usually configured in the device to store the temporary data for transmission. The data in the buffer for a packet must be kept on transmitting. If the size of the buffer in the device is not large enough and the buffer may not be efficiently refilled with subsequent data before the buffer empties, clearance of the buffer causes transmission discontinuity to the media and results in corrupting the packet which must be retransmitted. Also, clearance of the buffer is a condition known as buffer under-run. If buffer under-run occurs frequently, system performance is compromised.

FIG. 1 is a flowchart of a method for operating a conventional MAC controller. When the MAC controller attempts to transmit a packet, a request signal is first sent to the arbiter to request bus ownership. After the MAC controller acquires bus authority, data in the bus is stored into its buffer. After the buffer is fully filled, the MAC controller releases bus authority and keeps on transmitting the data to media. If the buffer is not large enough to store an entire packet, the remaining part of the packet from the bus refills the buffer before it empties. The buffer may empty before refilling, and result in generating buffer under-run so that the entire packet needs re-transmission.

To avoid buffer under-run, an entire packet can be buffered at once. Thus, the size of the buffer in the device is the same as the maximum packet size (MPS) based on the specification. For example, when the maximum packet size of a Ethernet MAC controller is equal to 1536 bytes, the size of the buffer in each Ethernet MAC controller is equal to 1536 bytes. Accordingly, four corresponding buffers, each having a size of 1536 bytes are implemented in four MAC controllers respectively for a specific application. Therefore, manufacturing costs are significant increased.

BRIEF SUMMARY OF THE INVENTION

A detailed description is given in the following embodiments with reference to the accompanying drawings.

Embodiments of a method and a system are disclosed for determining a size of a buffer according to a bus arbitration rule.

The present invention provides a method for determining a size of a buffer in an embedded system. The method includes the following steps. First, a buffer fill time (BFT) and a request response time (RRT) are measured, in which RRT is a response time unit that is an answer to a request signal from said buffer. Next, a media data rate (MDR) and a number of bus masters (NBM) are calculated. Finally, the size of the buffer in the embedded system is determined according to BFT, RRT, MDR, and NBM.

Furthermore, the present invention also provides an embedded system. The system includes a bus, a plurality of bus masters each having a buffer and a time-to-death (TTD) value that is utilized to record a current status of its corresponding buffer, wherein a size of the buffer is determined according to a buffer fill time (BFT), a request response time (RRT), a media data rate (MDR), and a number of bus masters (NBM), and an arbiter for receiving a plurality of request signals from the bus masters and for choosing one of the bus masters to access data through the bus according to a plurality of TTD values at each clock cycle, wherein a certain bus master with the lowest TTD value is chosen.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
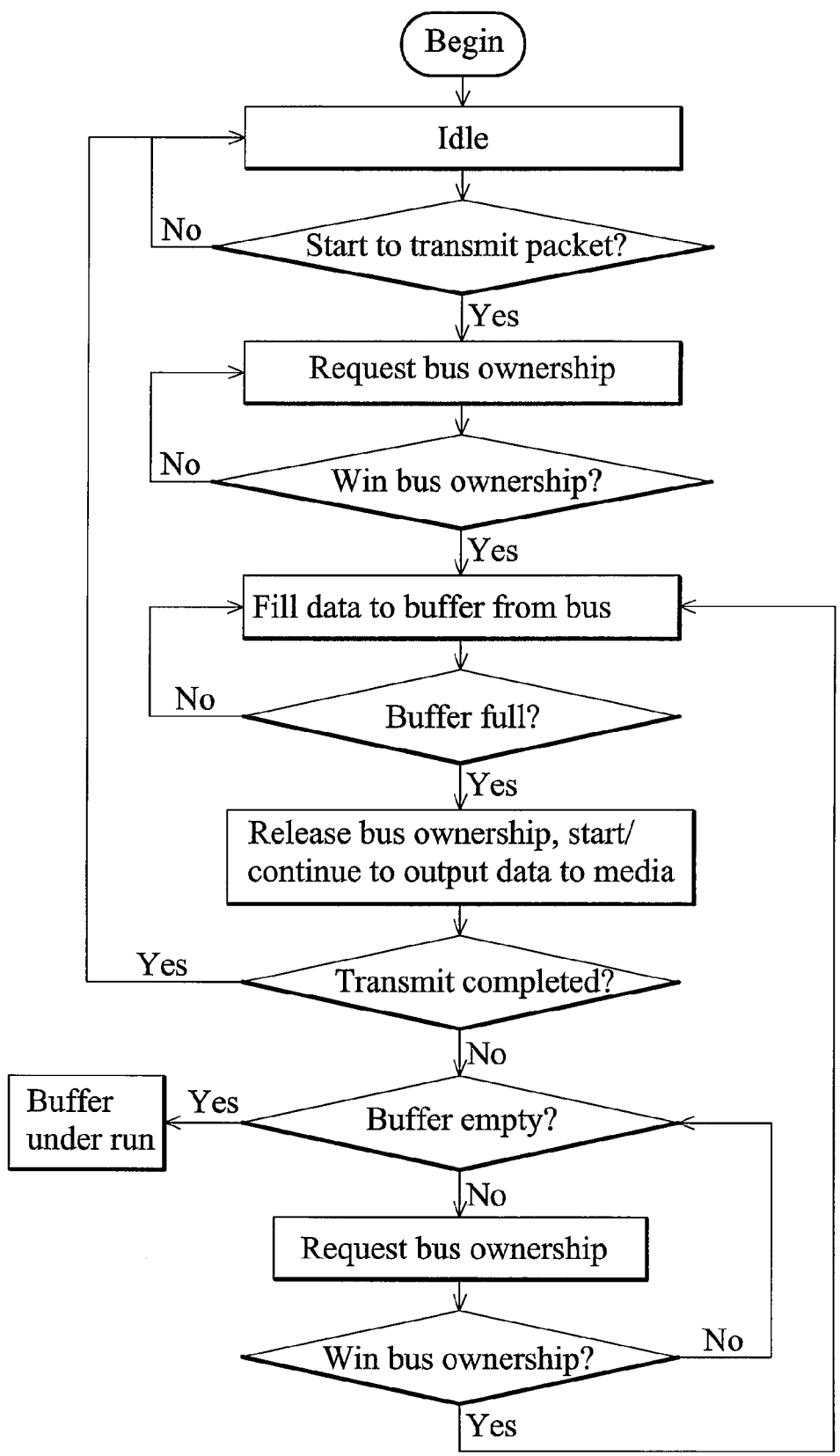
FIG. 1 is a flowchart of a method for operating a conventional MAC controller.
Figure 2:
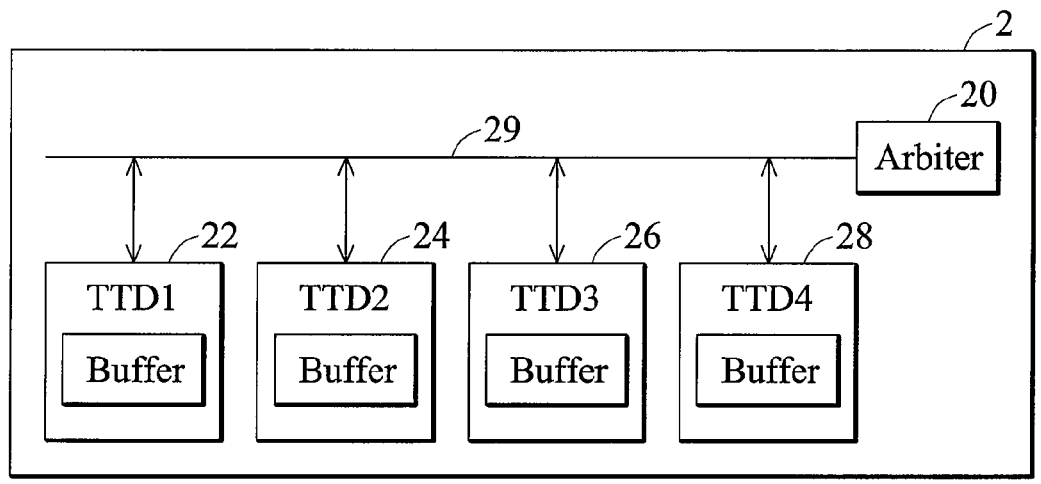
FIG. 2 is a block diagram of an embedded system according to an embodiment of the invention.

FIG. 2 is a block diagram of an embedded system according to an embodiment of the invention. The embedded system 2 comprises an arbiter 20, a plurality of devices 22, 24, 26 and 28, and a bus 29. In the present invention, the devices may be bus masters, any kind of communication devices or devices capable of continuous data transmission/reception (e.g. a MAC controller for wired or wireless Network applications). Each device comprises a buffer and a time-to-death (TTD) value. Here, the TTD values in devices 22, 24, 26 and 28 are denoted as TTD1, TTD2, TTD3, and TTD4 respectively.

The buffer herein stores temporary data during transmission and the TTD value is utilized to record a current status of a corresponding buffer. The current status of a buffer may be a condition that indicates a spending time when the data left in the buffer will be totally purged. Thus, the TTD value of a buffer is represented in a unit of clock cycles (T). For example, the buffer will empty after 20 clock cycles if the TTD value equals 20T. The data can be utilized only following 20 clock cycles. Hence, the corresponding TTD value of a device achieves maximum value when its buffer is full, or the corresponding TTD value is zero when its buffer is empty.

Figure 3:
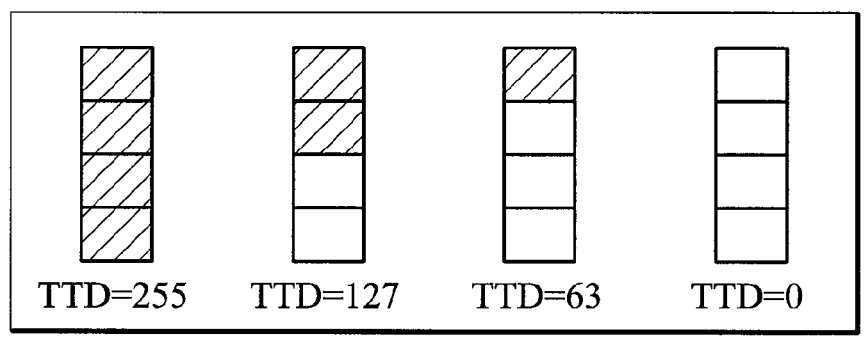
FIG. 3 schematically shows the relationship between current status of the buffer and the TTD value.

FIG. 3 shows the relationship between a current status of the buffer and TTD value. For example, the length of the TTD value is 8 bits in the field ranging from 0 to 255T. So, the TTD value is 255T when the buffer is full, or the TTD value is 0T when the buffer is empty. The corresponding TTD value, such as 63T or 127T shown in FIG. 3, will be changed according to the data left in each buffer. In other words, the buffer of the device with the lowest TTD value will empty first, and thus require refilling first. Buffer under-run will occur when the TTD value of the device becomes zero.

It is to be noted that the range of the TTD values can be adjusted dynamically to apply in variety fields according to system specification requirements and environments. Additionally, a TTD value can be changed such that it responds to the real situation of the buffer. In general, the TTD value of a buffer in a device is controlled by the device itself. In this embodiment, for example, when data is refilled in the buffer of a device 22 through a bus 29, its corresponding TTD value TTD1 is increased accordingly. Alternatively, after data in the buffer of the device 22 is transmitted to the media, its corresponding TTD value TTD1 is decreased accordingly.

As shown in FIGS. 2 and 3, an arbiter 20 controls bus authority. When a device asks for data access through the bus, a request signal with a TTD value is sent to the arbiter 20. The arbiter 20 chooses a device with a lowest TTD value to access the bus during each clock cycle of access. When data is refilled in the buffer of the chosen device through the bus, total data in the buffer is increased with its corresponding TTD value increasing accordingly. During transmission, data in the buffer is transmitted to the media at each clock cycle, and is decreased so that the corresponding TTD value is decreased according to the data left in the buffer at each clock cycle.

Moreover, the arbiter 20 keeps on monitoring the TTD values of all request signals, and chooses another device with the lowest TTD value to access data through the bus at another clock cycle. For example, at a specific clock cycle such as a clock cycle A, both devices 22 and 24 send request signals with corresponding TTD values TTD1 and TTD2 respectively to the arbiter 20 at the same time, wherein TTD1 is 2T and TTD2 is 5T. When the arbiter 20 receives these two request signals, the bus authority is assigned to device 22 due to its corresponding TTD value, TTD1, being the lowest. After several clock cycles, the TTD value, TTD2, of the device 24 decreases because the data in the buffer of the device 24 is sent out, but the TTD value, TTD1, of the device 22 is increased because the buffer of the device 22 keeps on storing the incoming data. Once TTD1 and TTD2 are supposed to be 10T and 1T respectively, when the arbiter 20 checks the TTD values of all requested devices again, the TTD value, TTD2, is found to be the lowest, and thus bus authority is assigned to the device 24 at that clock cycle. Therefore, the arbiter 20 assigns bus authority to each device according to the status of its corresponding buffer, and a device with the lowest TTD value will gain a bus authority first.

Although the effort to reduce the buffer size is large, it is still the main critical issue that how to optimize the buffer size without buffer under-run. In general, the system configuration and parameters, which are the number of bus masters, type of the processor, the media data rate, and the number of buses of an embedded system, such as the system on chip (SOC), can be predetermined. For example, the type of the microcontroller, the number of bus masters, the bus input/output data rates and bus bandwidth are all fixed in a SOC. Therefore, the system configuration and parameters can be utilized to determine the size of the buffer for each device in the embedded system.

Figure 4:
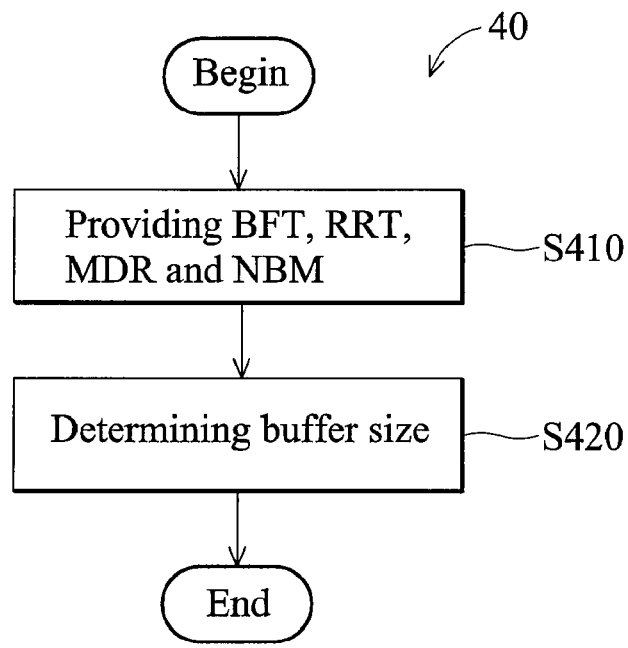
FIG. 4 is a flowchart of a method for determining a size of a buffer according to an embodiment of the invention.

FIG. 4 is a flowchart of a method for determining a size of a buffer according to an embodiment of the invention. First, in step S410, a buffer fill time (BFT), a request response time (RRT), a media data rate (MDR), and a number of bus masters (NBM) are provided according to the system configuration. Next, in step S420, a size of buffer for each device in the system is determined according to the BFT, the RRT, the MDR, and the NBM, wherein BFT is the time required to send data from the bus to the buffer of a requested device. Furthermore, RRT is the response time unit that is an answer to a request signal from the buffer, and the response time is the delay time for a bus master response, a bus authority handover by an arbiter and a bus data forwarding through a bridge. MDR is the maximum data transmission rate for sending the data from said buffer to a transmission media at each clock cycle. NBM is the number of bus masters (devices) that ask for real-time bandwidth.

Some devices, such as a CPU, a DMA controller, and bridges, can work with low bandwidth in an embedded system so that there is no requirement for transmitting data continuously among those devices. The arbiter waits to service those devices until no devices of real-time bandwidth request the bus authority. Therefore, at first, the corresponding TTD values of such devices without timing constraint can be defined as maximum values. The arbiter will thus grant the bus authority to the devices of real-time bandwidth rather than such devices without timing constraint.

MBS in unit of bytes is the size of a buffer in each device, and is determined according to the formula (1):

$$MBS = [(BFT+RRT)*NBM]*MDR. \quad (1)$$

For example, if NBM is 4, MDR is 1 byte/T, BFT is 2T and RRT is 3T, in which the label "1 byte/T" represents 1 byte per clock cycle. Accordingly, the size of the buffer in the device can be calculated by formula (1):

$$MBS = [(BFT+RRT)*NBM]*MDR$$
$$= [(2+3)*4]*1$$
$$= 20 \text{(bytes)}$$

Therefore, each device in a system having the above requirements needs only a buffer with a size of 20 bytes.

Additionally, if the bus data rate (BDR) represents the lowest bandwidth requirement of the bus, BDR can be calculated according to:

$$BDR = MBS/BFT \quad (2)$$

Taking the above example for instance, the bandwidth requirement of the bus can be calculated by formula (2):

$$BDR = MBS/BFT$$
$$= 20/2$$
$$= 10 \text{(bytes}/T)$$

Therefore, data of 10 bytes are stored into the buffer in the device of a bus authority through the bus at each clock cycle. Generally speaking, if the BDR value is below the system requirement, a buffer under-run won't happen.

With the calculated MBS by formula (1) and the bus arbitration rule with the TTD value, buffer under-run can be avoided such that efficient management of traffic flow onto the bus is achieved.

Figure 5:
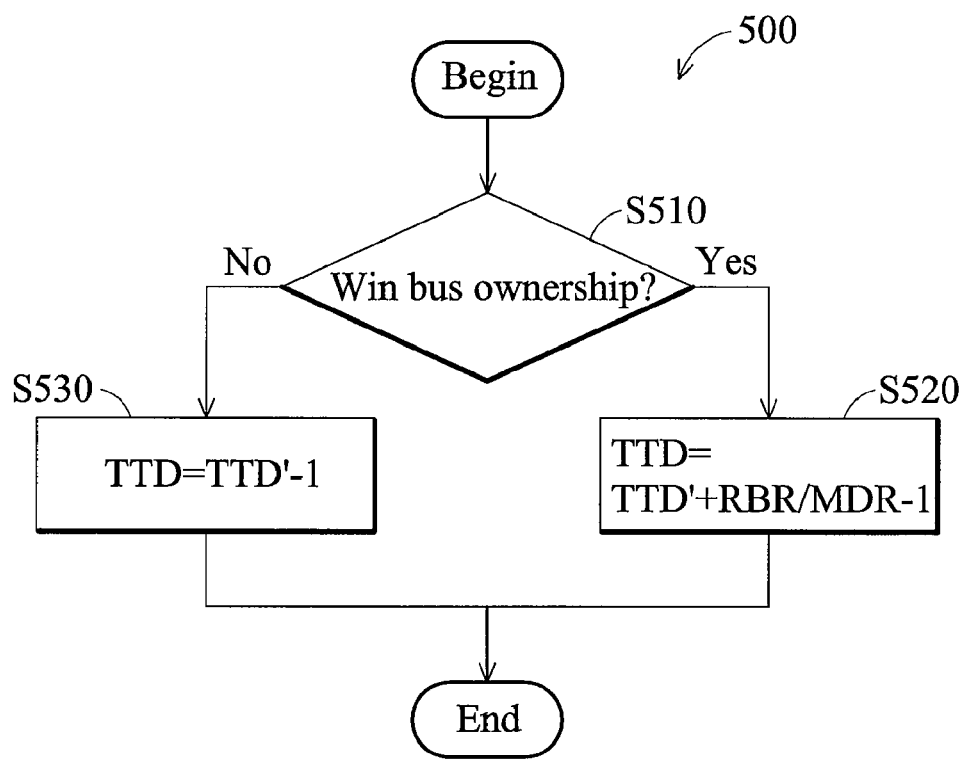
FIG. 5 schematically shows the relationship between the TTD value of a bus master and the bus authority.

FIG. 5 shows a relationship between the TTD value of a device and the bus authority. As shown in the figure, in step S510, this device first determines whether it has acquired the bus authority or not. In this embodiment, system bandwidth requirement RBR represents the data input rate for the bus to input data to the buffer. When the device acquires bus authority, data is refilled in its buffer through the bus and the data in the buffer is transmitted to the media concurrently. Thus, the TTD value at each clock cycle is increased by RBR and decreased by one, and can be expressed as TTD=TTD'+RBR/MDR−1 (step S520), in which TTD' represents the remaining buffer volume before acquiring the bus authority. If the bus authority is not granted, no data is refilled in the buffer, and data in the buffer is still transmitted to the media at each clock cycle, the TTD value at each clock cycle is decreased by one (TTD=TTD'−1) (step S530).

For example, for an embedded system with four Ethernet MAC controllers MAC1-MAC4, NBM, MDR, BFT, and RRT are supposed to be 4, 1 byte/T, 2T, and 3T respectively. The size of each buffer in each MAC controller can be calculated by formula (1):

$$MBS = [(BFT + RRT) * NBM] * MDR$$
$$= [(2+3)*4]*1$$
$$= 20 \text{(bytes)}$$

Meanwhile, the minimum bandwidth requirement of the bus can be obtained by formula (2):

$$BDR = MBS/BFT$$
$$= 20/2$$
$$= 10 \text{(bytes}/T)$$

Furthermore, the maximum TTD value is determined according to the formula (3):

$$MTTD=MBS/MDR \quad (3)$$

In the formula (3), MBS is the lowest buffer size of each device, MTTD is the maximum TTD value, and the MDR is the media data rate. The TTD value of each device ranges from 0 to MTTD. MTTD represents the maximum clock cycles needed to empty a full, corresponding buffer. If the MTTD value is selected accurately, the status of the buffer is managed efficiently. Among the stated parameters, the maximum TTD value, MTTD, is determined according to the following formula:

$$MTTD=MBS/MDR=20/1=20(T)$$

Therefore, the TTD value of each device is from 0T to 20T.

As the mentioned above, the bus authority is assigned to MAC1, MAC2, MAC3, and MAC4 in turn if the TTD values of each MAC controller are all the same. When all the MAC controllers need operating under full speed, the worst case happens. However, the bus authority can be granted to the above MAC controllers in order without chaos.

Figure 6:
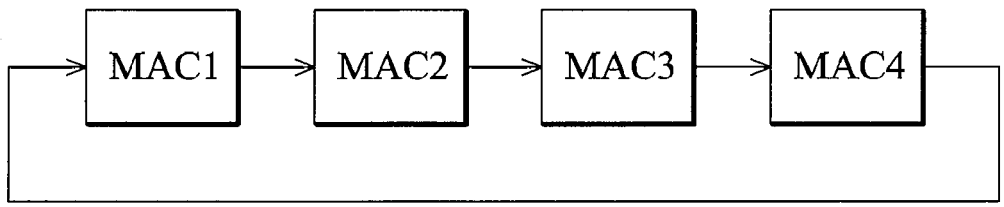
FIG. 6 schematically shows the priority of each MAC controller to acquire bus authority according to an embodiment of the invention.

FIG. 6 schematically shows the priority of each MAC controller to gain the bus authority according to an embodiment of the invention. As shown in the figure, the bus authority is assigned to MAC1, MAC2, MAC3, and MAC4 in turn. If no MAC controller requests the bus authority, the bus authority will be granted to the next MAC controller in the above flow path. For example, if the bus authority is currently granted to MAC1 and no other MAC controllers request the bus authority, MAC2 will gain the bus authority at the next clock cycle.

Figure 7:
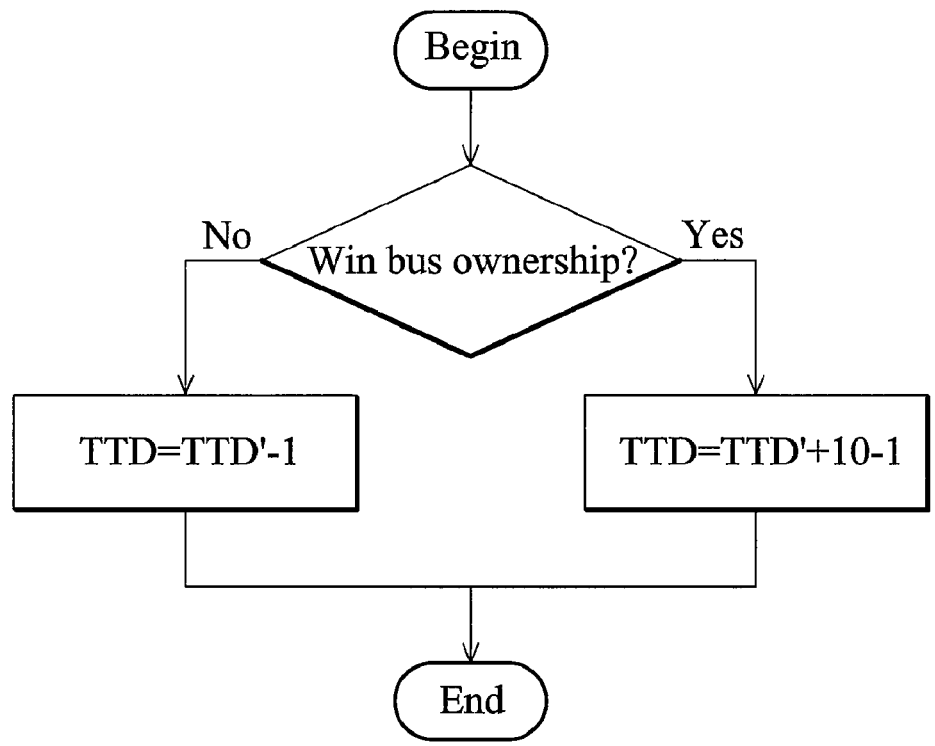
FIG. 7 shows the TTD value variation at each clock cycle according to an embodiment of the invention.

FIG. 7 shows TTD value variation at each clock cycle according to an embodiment of the invention. If RBR is supposed to be 10 bytes/T and the device gains the bus authority, data is refilled in its buffer through the bus and the data in the buffer is transmitted to the media concurrently. Thus, the TTD value variation at each clock cycle is first increased by 10 and then decreased by one (TTD=TTD'+10−1), in which TTD' represents the volume of the buffer before the clock cycle. If a device does not gain the bus authority, no data is refilled in its buffer and the data in the buffer is still transmitted to the media at each clock cycle so that the TTD value variation at each clock cycle is decreased by one (TTD=TTD'−1). For example, if the TTD values of devices MAC1, MAC2, MAC3 and MAC4 are TTD1, TTD2, TTD3 and TTD4 respectively, and each of TTD1, TTD2, TTD3 and TTD4 equals 3T, TTD1, TTD2, TTD3 and TTD4 will change to 12T, 2T, 2T and 2T respectively after one clock cycle when device MAC1 gains the bus authority.

As the mentioned above, four Ethernet MAC controllers MAC1, MAC2, MAC3, and MAC4 are supposed to be fast Ethernet MAC controllers as will as the bus is supposed to be an AHB bus with a clock rate of 100 Mhz and a bus bandwidth of 32 bits. Moreover, the clock cycle time is 10 ns per clock cycle (10 ns/T), and BFT and RRT are both equal to 8T so that the media data rate (MDR) of this system can be determined according to the bandwidth requirement of the AHB bus:

$$MDR=100 \text{ Mbits/s}=1 \text{ bit}/10 \text{ ns}=1 \text{ bit}/T=0.125 \text{ bytes}/T$$

Thus, according to the invention, the lowest buffer size of each MAC controller (MBS) can be calculated by formula (1):

$$MBS = [(BFT + RRT) * NBM] * MDR$$
$$= [(8+8)*4]*0.125$$
$$= 8 \text{(bytes)}$$

At this time, the minimum bandwidth requirement of the bus (MBS) can be calculated by formula (2):

$$BDR=MBS/BFT=8/8=1 \text{ (bytes}/T)$$

And the system bandwidth requirement of the AHB bus (RBR) is obtained from the following equation:

$$RBR=32 \text{ bits}/T=4 \text{ bytes}/T$$

Because the minimum bandwidth requirement of the bus MBS (1 bytes/T) is less than the bandwidth requirement of the AHB bus (4 bytes/T), even if each controller only allocates an 8-byte buffer, each device operating under the bus arbitration rules according to the invention will acquire the bus authority to refill data in the buffer before its TTD value becomes zero so that the buffer under-run never occurs. With carrying out the invention, buffer under-run is avoided even though all four MAC controllers transmit data at continuous full speed. Compared with the conventional method for buffer optimization, which allocates maximum packet size of 1536 bytes, the buffer size according to the present invention is just 8 bytes. Therefore, buffer size of each device and concurrent manufacturing costs are significantly reduced.

It is to be noted that the formulae, embodiments, and the disclosed methods are only examples, with the disclosure not limited thereto. The invention can be applied to any system whose configuration is fixed, in particular to SOC.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for determining a size of a buffer in an embedded system, comprising:
    receiving a buffer fill time (BFT) and a request response time (RRT) in which said RRT is a response time unit that is an answer to a request signal from said buffer;
    receiving a media data rate (MDR) and a number of bus masters (NBM); and
    determining said size of said buffer in said embedded system according to said BFT, said RRT, said MDR and said NBM,
    wherein said size of said buffer is proportional to at least one of the following:
        a product of the NBM and MDR; and
        a sum of the BFT and the RRT.

2. The method as claimed in claim 1, wherein said BFT is the time required to send a data from a bus to said buffer.

3. The method as claimed in claim 1, wherein said response time is the delay time for a bus master response, a bus authority handover by an arbiter and a bus data forwarding through a bridge.

4. The method as claimed in claim 1, wherein said MDR is the maximum data transmission rate for sending the data from said buffer to a transmission media at each clock cycle.

5. The method as claimed in claim 1, wherein said size of said buffer is proportional to a product of the NBM and MDR, and a sum of the BFT and the RRT.

6. A method for determining a size of a buffer in an embedded system, comprising:
    receiving a buffer fill time (BFT) and a request response time (RRT) in which said RRT is a response time unit that is an answer to a request signal from said buffer;
    receiving a media data rate (MDR) and a number of bus masters (NBM);
    determining said size of said buffer in said embedded system according to said BFT, said RRT, said MDR and said NBM;
    sending a plurality of request signals corresponding to said bus masters to a arbiter; and
    choosing one of said bus masters to access data through a bus by said arbiter during a access period according to a plurality of TTD (time-to-death) values stored in said bus masters respectively;
    wherein a chosen bus master has a specific TTD value that is the smallest and said specific TTD value is increased when said chosen bus master accesses data through the bus.

7. The method as claimed in claim 6, wherein the maximum value of said TTD values is in direct proportion with said size of said buffer while in reverse proportion with said MDR.

8. The method as claimed in claim 6, wherein said chosen TTD value is increased by a value of the bus bandwidth requirement and decreased by one at each clock cycle.

9. The method as claimed in claim 6, wherein the TTD values of corresponding bus masters, which are abandoned by said arbiter, are decreased.

10. The method as claimed in claim 6, wherein the TTD values of corresponding bus masters, which are abandoned by said arbiter, are decreased by one at each clock cycle.

11. The method as claimed in claim 6, further comprising choosing a certain bus master to access data through said bus when the TTD value of said certain bus master becomes lowest at a certain clock cycle.

12. An embedded system, comprising:
    a bus;
    a plurality of bus masters each comprising a buffer and a time-to-death (TTD) value that is utilized to record a current status of its corresponding buffer, wherein a size of said buffer is determined according to a buffer fill time (BFT), a request response time (RRT), a media data rate (MDR), and a number of bus masters (NBM); and
    an arbiter for receiving a plurality of request signals from said bus masters and choosing one of said bus masters to access data through said bus according to a plurality of TTD values at each clock cycle, wherein a certain bus master with the lowest TTD value is chosen, wherein said size of said buffer is proportional to at least one of the following:
        a product of the NBM and MDR; and
        a sum of the BFT and the RRT.

13. The system as claimed in claim 12, wherein the maximum value of said TTD values is in direct proportion with said size of said buffer while in reverse proportion with said MDR.

14. The system as claimed in claim 12, wherein said chosen TTD value is increased by a value of the bus bandwidth requirement and decreased by one at each clock cycle.

15. The system as claimed in claim 12, wherein the TTD values of corresponding bus masters, which are abandoned by said arbiter, are decreased.

16. The system as claimed in claim 12, wherein the TTD values of corresponding bus masters, which are abandoned by said arbiter, are decreased by one at each clock cycle.

17. The system as claimed in claim 12, further comprising choosing a certain bus master to access data through said bus when the TTD value of said certain bus master becomes lowest at a certain clock cycle.

18. The system as claimed in claim 12, wherein said bus masters are capable of transmitting/receiving continuously.

19. The system as claimed in claim 12, wherein said bus masters comprise communication devices.

20. The system as claimed in claim 12, wherein said embedded system is a system on chip (SOC).

21. The system as claimed in claim 12, wherein said size of said buffer is proportional to a product of the NBM and MDR, and a sum of the BFT and the RRT.

22. An embedded system, comprising:
    a bus;

a plurality of bus masters each comprising a buffer and a time-to-death (TTD) value that is utilized to record a current status of its corresponding buffer, wherein a size of said buffer is determined according to a buffer fill time (BFT), a request response time (RRT), a media data rate (MDR), and a number of bus masters (NBM); and an arbiter for receiving a plurality of request signals from said bus masters and choosing one of said bus masters to access data through said bus according to a plurality of TTD values at each clock cycle, wherein a certain bus master with the lowest TTD value is chosen, wherein said chosen TTD value is increased when said chosen bus master accesses data through the bus.

* * * * *